United States Patent [19]
Lund

[11] Patent Number: 4,945,942
[45] Date of Patent: Aug. 7, 1990

[54] ACCELERATED HOT WATER DELIVERY SYSTEM

[75] Inventor: William J. Lund, Stockton, Calif.

[73] Assignee: Metlund Enterprises, Stockton, Calif.

[21] Appl. No.: 414,394

[22] Filed: Sep. 29, 1989

[51] Int. Cl.⁵ .............................................. F16K 49/00
[52] U.S. Cl. ................................. 137/337; 137/624.12; 137/563; 126/362; 417/12
[58] Field of Search ....................... 137/624.11, 624.12, 137/337, 563, 565; 126/362; 417/12

[56] References Cited

U.S. PATENT DOCUMENTS

| | | | |
|---|---|---|---|
| 1,108,550 | 8/1914 | Chubb | 137/337 |
| 2,842,155 | 7/1958 | Peters | 137/337 |
| 3,144,904 | 8/1964 | Kahn et al. | 165/73 |
| 3,543,836 | 12/1970 | Paulson | 137/337 |
| 3,799,181 | 3/1974 | Maddren | 137/337 |
| 4,142,515 | 3/1979 | Skaats | 417/12 |
| 4,160,461 | 7/1979 | Vataru et al. | 137/337 |
| 4,201,518 | 5/1980 | Stevenson | 417/12 |
| 4,286,573 | 9/1981 | Nickel | 126/362 |
| 4,321,943 | 3/1982 | Haws | 137/337 |
| 4,391,295 | 7/1983 | Stipe | 137/522 |
| 4,518,007 | 5/1985 | Haws | 137/337 |
| 4,697,614 | 10/1987 | Powers et al. | 137/337 |
| 4,750,472 | 6/1988 | Fazekas | 417/12 |
| 4,778,224 | 1/1989 | Haws | 137/337 |

FOREIGN PATENT DOCUMENTS 469846 12/1946 Canada .

Primary Examiner—A. Michael Chambers
Attorney, Agent, or Firm—Walter A. Hackler

[57] ABSTRACT

A plumbing system in accordance with the present invention provides for accelerated hot water delivery to a plurality of plumbing fixtures from a hot water source. Flow switch means are provided to enable a pump to circulate hot water to the plumbing fixtures in response to water being withdrawn from a plumbing fixture. In addition, the hot water source may include a hot water recovery apparatus for withdrawing hot water from circulation pipes subsequent to cessation of water flow from a plumbing fixture.

1 Claim, 1 Drawing Sheet

ACCELERATED HOT WATER DELIVERY SYSTEM

The present invention is generally directed to plumbing systems and more particularly directed to a circulating hot water plumbing system of high thermal efficiency.

As described in U.S. Pat. Nos. 4,321,943 and 4,798,224, a considerable amount of thermal energy may be wastefully dissipated from hot water lines which provide hot water to plumbing fixtures, such as domestic wash basins, dishwashers and clothes washers. In addition, if water is allowed to run down the drain while waiting for hot water to be delivered to the fixture from a remote hot water source, a substantial water loss may occur.

In order to reduce such water loss, plumbing systems have been devised which continuously circulate hot water from a hot water source to the fixture and back to the hot water source. In this arrangement, a supply of hot water is always adjacent a plumbing fixture despite the remote position of the hot water source. The water loss is then limited to the amount of cold water disposed in draw pipes interconnecting the plumbing fixture to the hot water conduit in which hot water is circulated.

While this system substantially reduces the amount of water which must be withdrawn from the fixture before suitable hot water is obtained, it is not energy efficient because the array of pipes interconnecting the plumbing fixtures in the hot water source provide an enormous surface area for thermal radiation therefrom. In addition, the electrical cost of running a circulating pump may cause such system to be prohibitive in view of the latest energy conscious code requirements of most governmental agencies.

Thermal losses in both circulating and non-circulating plumbing systems have been reduced by insulation of the hot water lines as well as the hot water heaters which feed the plumbing fixtures. While such insulation slows the dissipation of heat, no savings occur over an extended period of time in non-circulating systems as intermittent use of hot water through the lines still allows hot water to cool to ambient temperature. In circulating systems, of course, there is a continual thermal loss.

With specific reference to non-circulating systems, devices have been developed to actually recover the hot water remaining in the hot water lines after the use of a fixture by drawing the hot water back into the hot water tank, see for example, U.S. Pat. Nos. 4,321,943 and 4,798,224. Because hot water is removed from the lines, there is an actual reduction in the amount of heat loss rather than just a slowing of heat loss as occurs through the use of insulation alone.

The present invention is directed to an accelerated hot water delivery system which substantially reduces thermal losses by providing intermittent circulation through the hot water lines. Further, apparatus in accordance with the present invention, may include hot water recovery apparatus to remove hot water intermittently circulated within the hot water conduit lines in order to complement the thermal efficiency of the system.

SUMMARY OF THE INVENTION

A plumbing system in accordance with the present invention generally includes a hot water source and conduit means, in fluid communication with the hot water source and at least one plumbing fixture, for enabling circulation of hot water from the hot water source to the plumbing fixture and return to the hot water source. In this manner, a ready source of hot water may be provided at all times adjacent to the plumbing fixture so that water usage is substantially reduced.

Means are provided for circulating hot water through the conduit means and flow switch means are included for generating a signal in response to water flow in the conduit means.

In order to substantially improve the thermal efficiency of the system, control means are provided for causing the pump means to circulate hot water through the conduit means in response to the flow switch means signal and for stopping the pump means. Thus, according to the present invention, hot water is not continuously circulated through the conduit means but only caused to flow therethrough once water flow is detected therein, such water flow being initiated by withdrawal of water from a plumbing fixture connected thereto.

More particularly, the present invention may include temperature sensor means for generating a signal in response to sensing a selected water temperature in the conduit means and the control means is configured to be responsive to the temperature sensor signal for stopping the pump means. This feature conserves electrical energy by stopping the circulation of hot water through the pipes by the pump once a selected water temperature is reached within the conduit. The temperature sensor means may be disposed adjacent a fixture and hence when water withdrawn from the fixture reaches a selected temperature, hot water circulation through the conduit means is no longer necessary as hot water of the selected temperature has been delivered to the fixture. It should be compared to prior art systems, where it continually circulates water through the conduit system, whether water is withdrawn therefrom or whether hot water is present in the conduit adjacent to a plumbing fixture from which hot water is desired.

In addition, the plumbing system in accordance with the present invention may include timing means for causing the control means to stop the pump after a selected period of time. This feature provides for the cessation of circulation in the conduit means and consumption of electrical energy by the pump at a preselected time in the event that the temperature sensor does not produce a signal in sufficient water temperature in the conduit which may be caused by malfunction in the hot water source or depletion of hot water from a source such as a hot water tank.

To further enhance the delivery of hot water to the plumbing fixtures, the plumbing system may include draw pipes interconnected between the plumbing fixtures and the conduit means and the conduit means comprises a conduit pipe having a substantially larger diameter than the draw pipe. This results in a significant reduction of delivery time of hot water from the hot water source to the fixture.

To further conserve thermal energy, the plumbing system in accordance with the present invention may include one-way valve means, disposed proximate the plumbing fixture, for enabling cold water to pass from a cold water line into the conduit means and the hot water source comprises hot water recovery means for drawing hot water from the conduit means into the hot water source subsequent to withdrawal of hot water from the plumbing fixture. The hot water withdrawn from the conduit is replaced by the cold water passing through the one-way valve means. More particularly the hot water recovery means may include means for causing a pressure differential between the cold water line and the hot water conduit as hot water is withdrawn from the hot water conduit means, such that subsequent to such hot water withdrawal, cold water passes through the one-way valve from the cold water line into the hot water conduit, thus forcing hot water in the hot water conduit into the hot water source.

BRIEF DESCRIPTION OF THE DRAWINGS

The advantages and features of the present invention will appear from the following description when considered in conjunction with the accompanying drawings in which.

DETAILED DESCRIPTION

Figure 1:
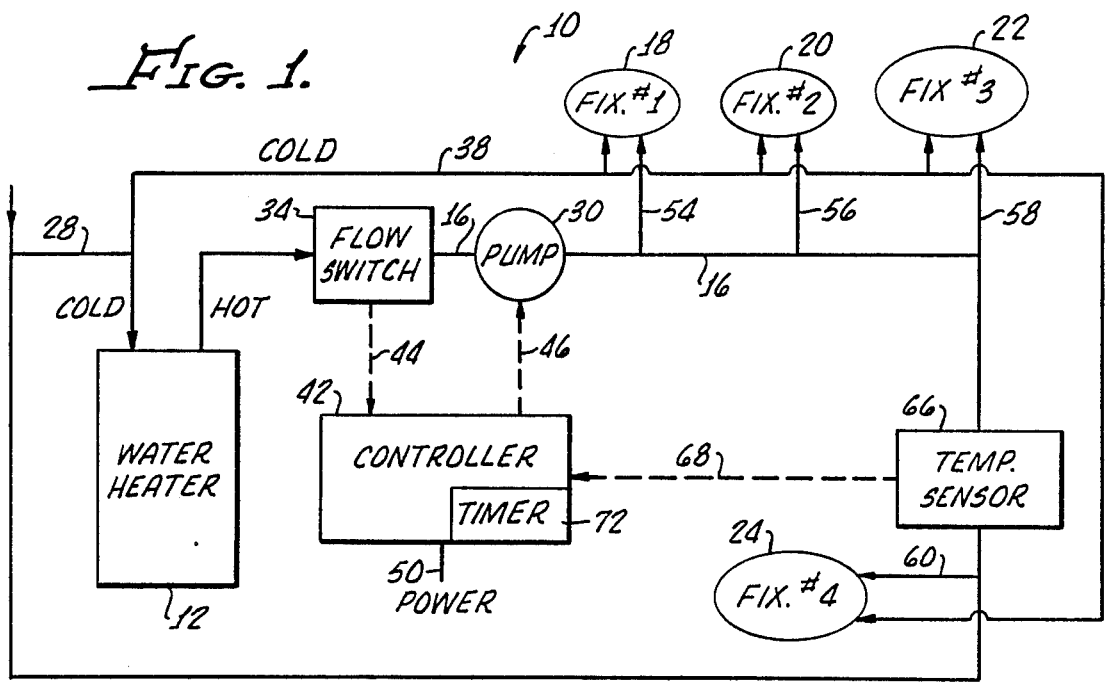
FIG. 1 is a flow diagram of a plumbing system in accordance with the present invention, generally showing a hot water source and conduit means, in communication with at least one plumbing fixture, along with a pump, a flow switch and a controller.

Turning now to FIG. 1 there is shown a plumbing system 10 which generally includes a hot water source such as a gas or electric water heater 12 interconnected by means of pipes 16 with water fixtures 18, 20, 22, 24, which provides a conduit means for enabling circulation of hot water from the hot water source 12 to each of the plumbing fixtures 18, 20, 22, 24 and return to the hot water source 12.

The hot water heater 12 may be of conventional constuction and connected to a cold water source through inlet pipe 28. A conventional pump 30 is installed in the pipe 16 and provides means for circulating hot water through the pipe 16. When not operating, the pump 30 allows reverse water flow therethrough in connection with the operation of the plumbing system 10, as will be hereinafter described in greater detail. A flow switch 34 is installed in the pipe 16 and may be of conventional construction for providing a means for generating a signal, such as, for example, an electrical signal, in response to water flow in the pipe 16.

Each of the plumbing fixtures 18, 20, 22 and 24 are interconnected to the cold water line 28 via a feed line 38.

A controller 42 which may be of any conventional mechanical and/or electrical design is interconnected with the flow switch 34 and the pump 30 by lines 44, 46, respectively, and provides means for causing the pump means to circulate hot water through the pipe 16 in response to the flow switch means signal and for stopping the pump means.

As would typically be the case, the pump 30 may include an electrical motor (not separately shown) and the controller 42 operates through an electrical signal from the flow switch 34 through the line 44 to connect and disconnect the pump 30 with a power source 50.

Hence, when fixtures 18 and 20, 22, 24 are not drawing water from the pipe 16, the controller prevents circulation of water through the pipe 16, conserving electrical energy. When, however, water is drawn from one of the fixtures 18, 20, 22, 24, it is sensed by the flow switch 34 which provides a signal to the controller 42 to energize the pump 30 to rapidly circulate water through the pipe 16. The fixtures 18, 20, 22, 24 may include communication with the pipe 16 through draw pipes 54, 56, 58, 60 and in order that the circulation of water through the pipe 16 be substantially greater than that drawn through anyone of the draw pipes 54, 56, 58, 60, the pipe 16 may have a substantially larger diameter than the draw pipe 54, 56, 58, 60. As, for example, the pipe 16 may be of conventional ¾ inch American Standard pipe size while the draw pipes 54, 56, 58, 60 may be ½ inch American Standard pipe.

In order to prevent continued circulation of water through the pipe 16 after hot water is delivered to any one or more of the fixtures 18, 20, 22, 24, a temperature sensor 66, which may be of any conventional construction, may be installed in the pipe 16 for providing means for generating a signal in response to sensing a selected water temperature in the conduit means. Correspondingly, the controller 42 may include conventional electrical circuitry for responding to the signal sent thereto over a line 68 in order to stop the pump 30. It should be clear that as water is drawn from anyone of the fixtures, the pump 30 circulates water through the pipe 16 and such circulation is unnecessary after hot water is delivered to the fixture at a selected water temperature. It is stopped by the operation of the temperature sensor 66 and controller 42. Again, this feature conserves electrical energy.

Alternatively, a conventional electrical or mechanical timer 72, which may be incorporated into the controller or disposed separately therefrom, may be provided, in order to stop the pump after a selected period of time. In this embodiment, upon installation of the plumbing system 10, water temperature measurements versus time can be made during the draw of hot water from anyone of the fixtures 18, 20, 22, 24 and on the basis of such data, an appropriate time selected to enable the pump 30, to circulate hot water to all of the fixtures 18, 20, 22 and 24.

While the timer 72 may be disposed anywhere within the system, it is preferred that the temperature sensor 66 be disposed along the conduit adjacent the most remote fixture 24 from the hot water heater 12.

Figure 2:
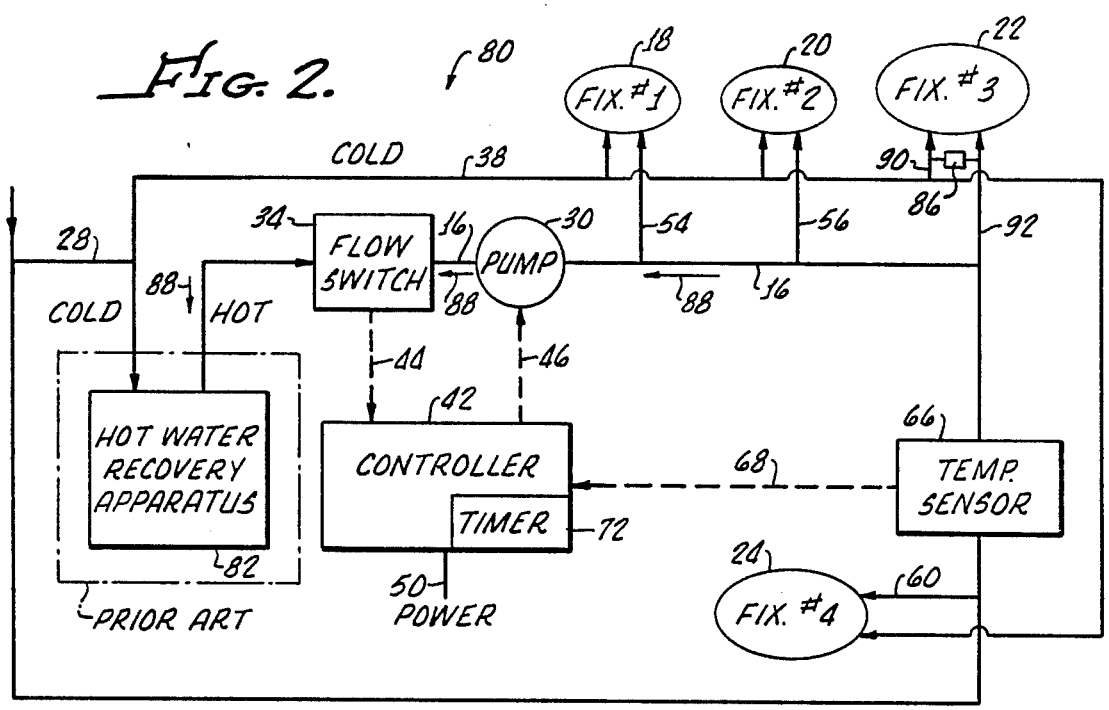
FIG. 2 is a flow diagram of a plumbing system in accordance with the present invention further including hot water recovery apparatus.

Turning now to FIG. 2 there is shown another embodiment of the present invention in which a plumbing system 80 incorporates hot water recovery apparatus 82 as hereinafter described. Similar or equivalent components of the plumbing system 80 are identified with the same character references used to identify corresponding components in the plumbing system 10. The hot water recovery apparatus 82 may be as described in U.S. Pat. Nos. 4,321,941 and 4,798,224, these patents being incorporated herein by specific reference thereto for the purpose of identifying and describing such hot water recovery apparatus. Details of their operation are only summarized herein for the sake of clarity.

Generally, the hot water apparatus 82 operates in cooperation with a one-way valve 86 interconnecting valve 86 interconnecting a cold water draw line 90 and a hot water draw line 92 approximate the selected fixture 22. As described in U.S. Pat. No. 4,321,943 and/or U.S. Pat. No. 4,798,224, the hot water recovery apparatus 18 functions to pull hot water from the pipe 16 following termination of water flow through anyone of the fixtures 18, 20, 22, 24 via the one-way valve 86 interconnected between the draw lines 90, 92. A pressure differential created between the cold water line 38 and the hot water pipe 16 causes a water flow through the one-way valve 86 from the cold water line 38 into the hot water line 16 and back into the hot water recovery apparatus 82 as indicated by the arrows 88.

Although there has been hereinabove described a particular arrangement of an actuated hot water delivery system in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. A plumbing system comprising:
   a hot water source;
   conduit means, in fluid communication with said hot water source and at least one plumbing fixture, for enabling circulation of hot water from said hot water source to said plumbing fixture and return to said hot water source;
   pump means for circulating hot water through the conduit means;
   flow switch means for generating a signal in response to water flow in said conduit means;
   control means for causing said pump means to circulate hot water through the conduit means in response to the flow switch means signal and for stopping said pump means, said control means including timing means for causing said control means to stop the pump means after a selected period of time;
   temperature sensor means for generating a signal in response to sensing a selected water temperature in said conduit means, said control means being responsive to said temperature sensor means signal for stopping said pump means; said sensor means being disposed along said conduit and adjacent to said plumbing fixture;
   a draw pipe connected between each plumbing fixture and the conduit means and wherein said conduit means comprises a conduit pipe having a substantial larger diameter than said draw pipe;
   one-way valve means, disposed proximate said plumbing fixture, for enabling cold water to pass from a cold water line into said conduit means; and
   hot water recovery means for drawing hot water from said conduit means into said hot water source subsequent to withdrawal of hot water from said plumbing fixture, hot water withdrawn from said conduit being replaced by cold water passing through said one-way valve means.

* * * * *